United States Patent [19]
Wittrin

[11] Patent Number: 5,225,903
[45] Date of Patent: Jul. 6, 1993

[54] AUTOMATIC CONTRAST AND BRIGHTNESS CONTROL SYSTEM FOR THERMAL IMAGE APPARATUS INTEGRATED INTO AN AIRCRAFT

[75] Inventor: Gerd Wittrin, Aalen, Fed. Rep. of Germany

[73] Assignee: Carl-Zeiss-Stiftung, Heidenheim, Fed. Rep. of Germany

[21] Appl. No.: 836,135

[22] Filed: Feb. 14, 1992

[30] Foreign Application Priority Data

Feb. 18, 1991 [DE] Fed. Rep. of Germany ....... 4104886

[51] Int. Cl.$^5$ .................. H04N 5/33; H04N 5/37; H04N 7/18
[52] U.S. Cl. .................. 358/113; 358/168; 358/169; 358/183
[58] Field of Search .............. 358/113, 183, 168, 169

[56] References Cited

U.S. PATENT DOCUMENTS 4,618,892 10/1986 Kawaguchi .................. 358/113
5,083,204 1/1992 Heard .................. 358/113

Primary Examiner—Howard W. Britton
Attorney, Agent, or Firm—Walter Ottesen

[57] ABSTRACT

An automatic contrast and brightness control system for thermal image apparatus in aircraft utilizes a section from the thermal image adapted to the flight and topography conditions to form the actual value with the section being shifted in dependence upon the image content.

2 Claims, 4 Drawing Sheets

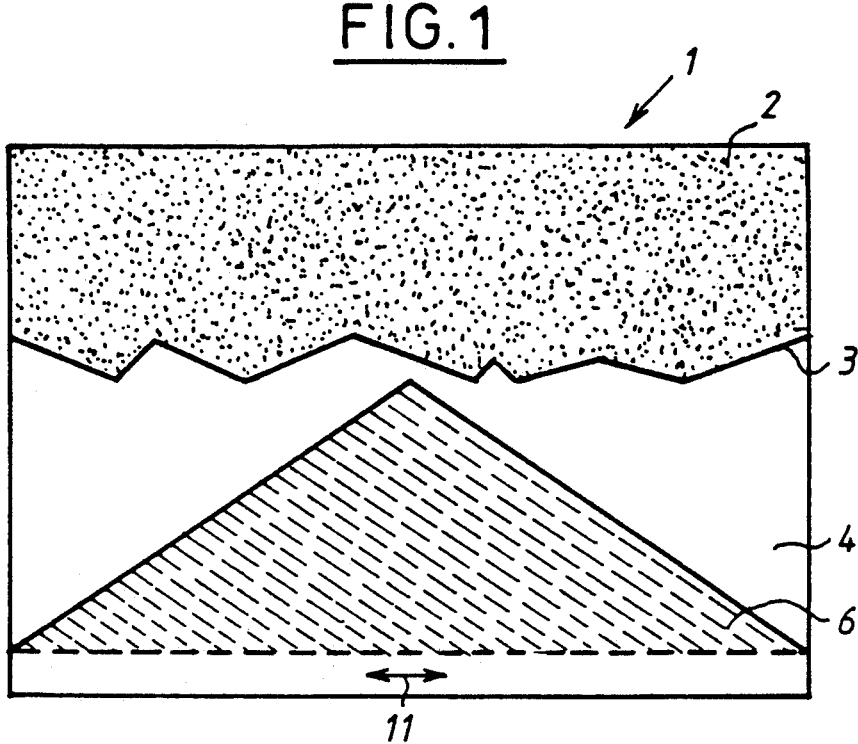
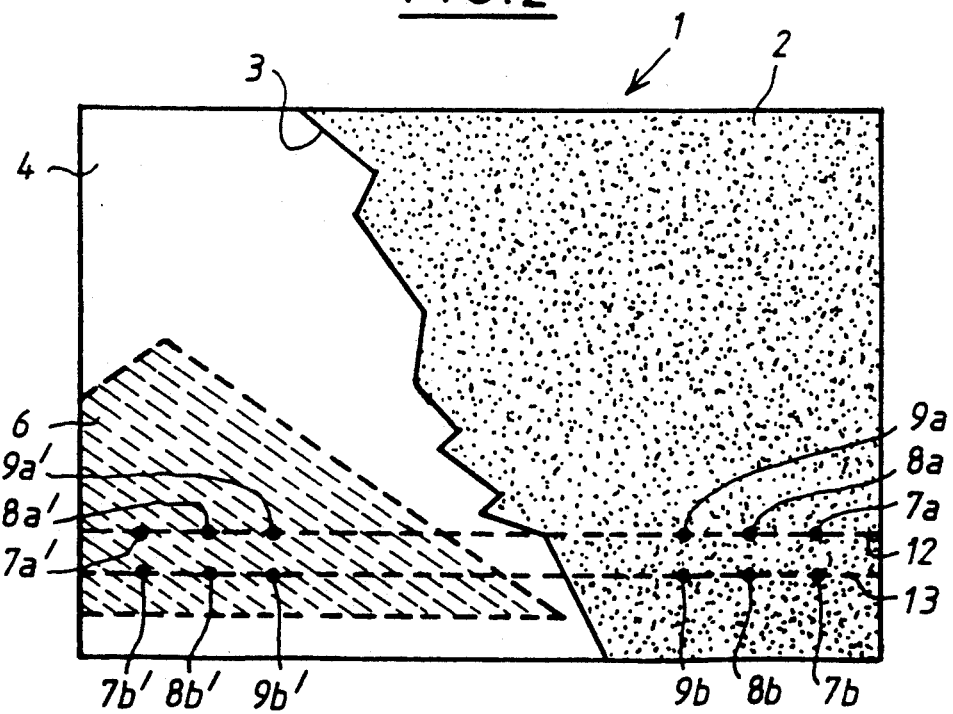

AUTOMATIC CONTRAST AND BRIGHTNESS CONTROL SYSTEM FOR THERMAL IMAGE APPARATUS INTEGRATED INTO AN AIRCRAFT

FIELD OF THE INVENTION

The invention relates to an automatic contrast and brightness control system for thermal image apparatus of an integrated forward-looking-infrared (FLIR) system in an aircraft which utilizes a window of the FLIR-image for forming the actual values of contrast and brightness.

BACKGROUND OF THE INVENTION

FLIR-systems are integrated into the aircraft weapon system for target location and target abatement. These systems are intended to increase the operational efficiency of the aircraft and lighten the burden on the pilot. A thermal image apparatus is an essential component of the FLIR-system and generates a visible image on a TV-monitor (FLIR-image) corresponding to the infrared radiation of the scene under observation. Hot targets with intense infrared radiation are thereby displayed as white while cold targets having lower infrared radiation are displayed as black.

The FLIR-system is equipped with an automatic contrast and brightness control system for lessening the burden on the pilot. This system is intended to display scenes of special importance for the pilot which are below the horizontal line so that they are displayed rich in contrast and with average brightness. This is achieved conventionally in that for the actual-value formation of the contrast and brightness control, not the entire FLIR-image is utilized; instead, only a horizontal strip-shaped segment (hereinafter referred to as evaluation window) is utilized. The upper boundary of the contrast and brightness window extends in the vicinity of the horizon line as it is visible in the normal flying position. On the other hand, the lower boundary lies at a distance away from the lower image edge such that the scenes, which change rapidly because of the flying speed, are not considered for the contrast and brightness control.

Disadvantages of this solution occur with intense roll movements of the aircraft wherein larger surfaces of the sky and smaller surfaces of the earth are imaged on the monitor than during normal flight. With the appearance of large black areas on the monitor, the automatic contrast and brightness control of the system becomes operational and reacts in that the contrast of the thermal image is attenuated and its brightness is increased which, in this case, causes a weak image having low contrast to be provided for the pilot.

SUMMARY OF THE INVENTION

It is an object of the invention to improve the automatic contrast and brightness control for thermal image apparatus of aircraft during roll movements of the aircraft.

The control system of the invention is for the automatic contrast and brightness control for thermal image apparatus of a FLIR-system integrated into an aircraft. The FLIR-system includes a TV-monitor on which an FLIR-image having an evaluation window is formed. The control system includes: circuit means for fixing the shape of the evaluation window; actual-value forming means for forming the actual values for contrast and brightness; and, displacing circuit means for displacing the window in dependence upon the content of the FLIR-image as defined by the actual values.

In an advantageous embodiment of the invention, the form of the window corresponds to an isosceles triangle which, in normal flight, is arranged in the FLIR-image so that its base extends over the entire width of this image and is spaced from the lower edge of the image to the extent that the scenes, which change rapidly because of the speed of the aircraft, extend and the apex of the isosceles triangle extends to the horizon line.

The form of the window as having a triangular form is described here only as being exemplary. This window could also have other forms adapted to the scenes over which the aircraft flies and adapted to the flight conditions. What is important for the advantageous use of the invention is however the displaceability of the window in the FLIR-image which is undertaken in correspondence to the image content determined by the contrast and brightness control system.

With the suitably selected and pregiven form of the evaluation window for the contrast and brightness control and by means of its automatically controlled displacement, the condition is prevented that the cold sky enters the evaluation window during roll movements up to approximately 90° and unfavorably influences the contrast and brightness control. The advantages obtained in the invention therefore include that the brightness in the thermal image is not made brighter and the contrast is not attenuated during roll movements of the aircraft of up to near 90°. This effects a significant improvement with respect to the detectability of details of a scene during roll movements.

BRIEF DESCRIPTION OF THE DRAWINGS

The invention will now be described with reference to the drawings wherein:

FIG. 1 is a schematic of an evaluation window as provided by the invention during a normal flight position of the aircraft;

FIG. 2 shows the evaluation window of FIG. 1 in a displaced position during an approximately 70° roll inclination of the aircraft;

DESCRIPTION F THE PREFERRED EMBODIMENTS OF THE INVENTION

Figure 3:
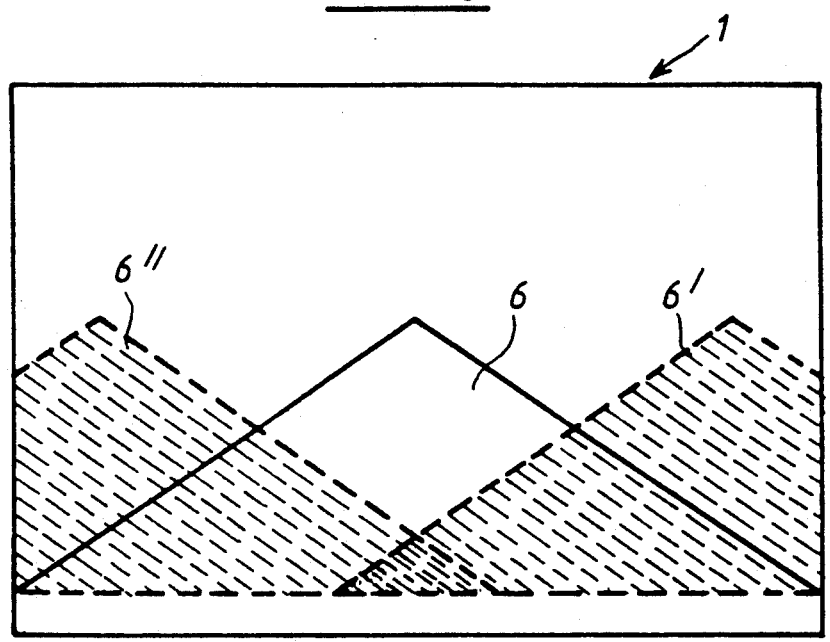
FIG. 3 is a schematic showing the displaceability of the evaluation window as provided by the invention.

In FIGS. 1, 2, 5 and 6, reference numeral 1 identifies the FLIR-image which appears on the display screen of a TV-monitor of a scene received by a FLIR-system. The sky is a cold target for the FLIR-system and is symbolically illustrated in black by means of black dots which are identified by reference numeral 2. The earth is a hot target and is displayed as white and is identified by reference numeral 4. The horizon line 3 separates sky and earth in the display of the thermal image.

Figure 5:
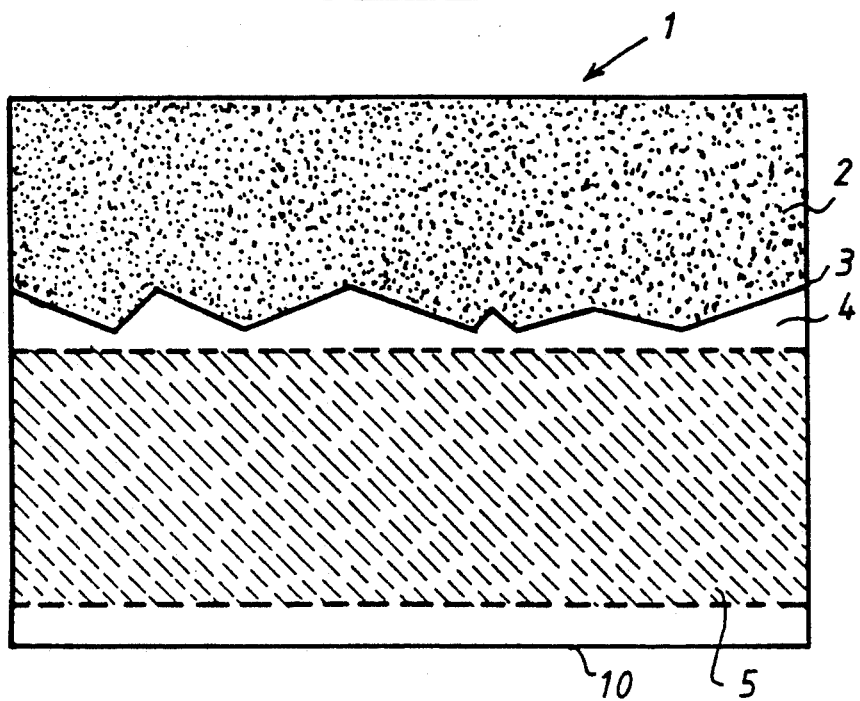
FIG. 5 is a schematic of a known evaluation window for the contrast and brightness control within a thermal image for a normal flight position; and, FIG. 6 shows the evaluation window of FIG. 5 during a 90° roll inclination of the aircraft.
Figure 6:
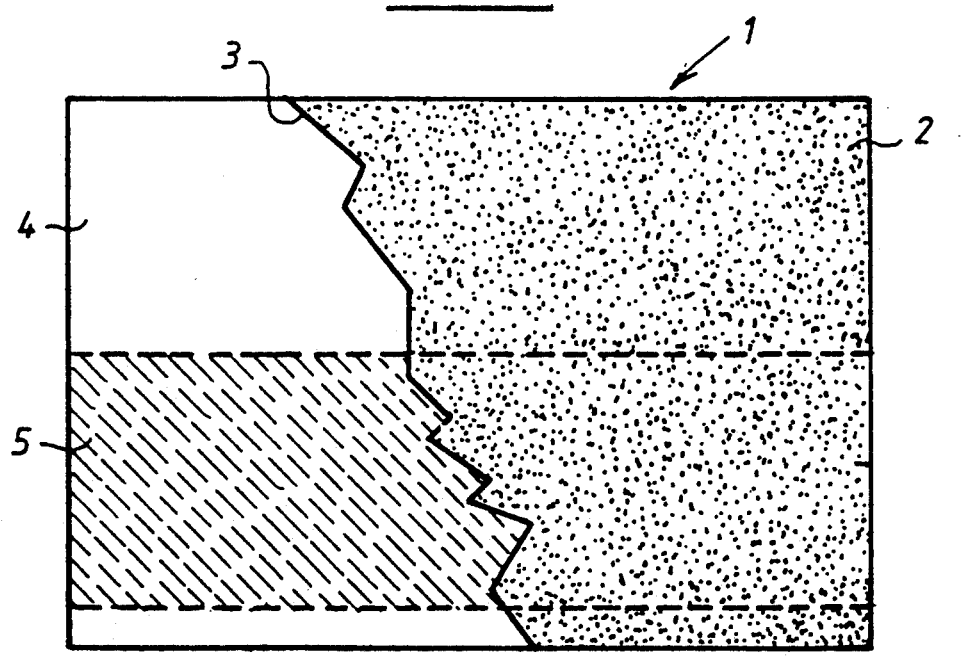

From the illustrations of FIGS. 5 and 6, it becomes apparent how an evaluation window known from the state of the art operates for the contrast and brightness control. From the drawings, it is apparent that the upper boundary of the rectangular evaluation window 5 extends approximately along the horizon line 3. The lower boundary of the contrast and brightness window 5 is disposed so far from the lower image edge 10 that the scenes, which change rapidly because of the speed of the aircraft, are not considered for the formation of the actual value of the contrast and brightness control.

From FIG. 6, it is apparent that large areas of the cold sky 2 are effective in the evaluation window 5 during sharp roll movements of the aircraft. The automatic contrast and brightness control then reacts in that the control attenuates the contrast of the thermal image and increases its brightness because of the extreme temperature difference between the cold sky 2 and the warm earth 4.

FIGS. 1 and 2 show the operation of the evaluation window 6 provided by the contrast and brightness control according to the invention. The form of the evaluation window is not a horizontally extending rectangle as known from the prior art; instead, the form is adapted to the requirements of the flight conditions and of the topography overflown by the aircraft. In the embodiment shown, the form of the evaluation window corresponds to an isosceles triangle which is displaceable horizontally in both directions as indicated by the double arrow 11. The control signal for the displacement of the evaluation window 6 is obtained by evaluating the lines in the FLIR-system corresponding to the lower image edge. For this purpose, the lines are interrogated starting from the left and right image edges at specific intervals with respect to the brightness amplitude.

In FIG. 2, the interrogated lines are identified by reference numerals 12 and 13 and the interrogated positions in the lines in the right image margin are identified by reference numerals (7a, 7b, 8a, 8b, 9a, 9b) and at the left-hand edge by numerals (7a', 7b', 8a', 8b', 9a', 9b'). When the interrogation results in no amplitude this corresponds to a black image or the image of the cold sky. The sky 2 projects up into the right lower image edge when the roll is, for example, in the counterclockwise direction. The evaluation of the lines 12 and 13 at the dots (7a, 7b, 8a, 8b, 9a, 9b) results in no amplitude being present. Because of this information, a control signal is generated which displaces the evaluation window toward the left into the position shown in FIG. 2. The cold sky then no longer projects into the evaluation window during this roll movement of the aircraft and can no longer influence the contrast and brightness control in this shifted position of the evaluation window 6.

Three different positions of a triangularly-shaped evaluation window 6 are shown in FIG. 3. During normal flight, the evaluation window 6 is in the position identified by 6 and, during a roll movement of the aircraft in the clockwise direction, the window is displaced into the position 6' and, for a roll movement of the aircraft in the counterclockwise direction, the evaluation window 6 is displaced into the position 6". No data is required from the aircraft for the displacement of the evaluation window. The displacement is produced solely by the control system in dependence upon the content of the FLIR-image.

Figure 4:
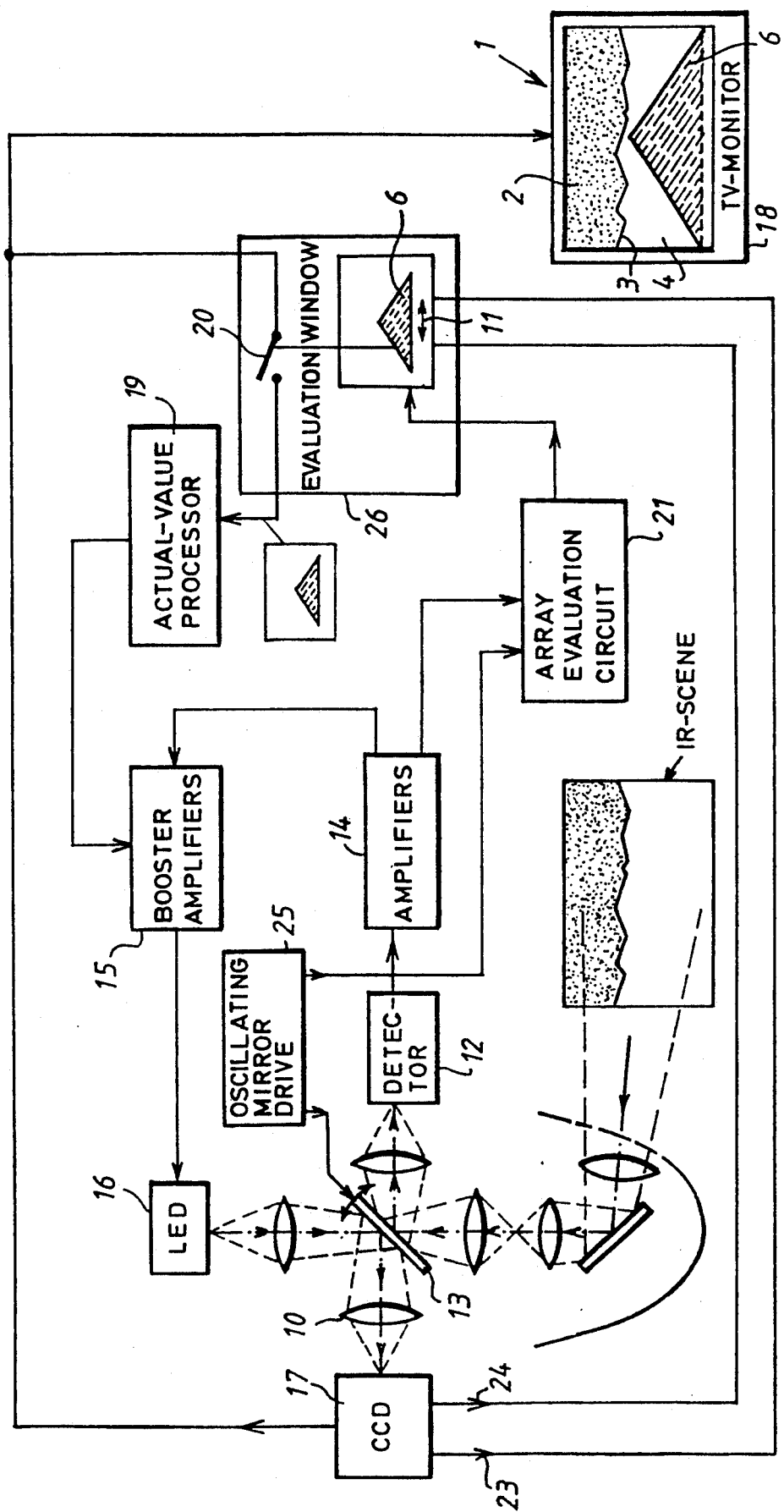
FIG. 4 is a block diagram of the control system according to the invention for the automatic control of contrast and brightness.

The block diagram shown in FIG. 4 shows an embodiment of the control system according to the invention. The scanning process, known per se and used in the FLIR-system, is characterized as a parallel scan process. It is characterized by IR-detector elements 12 (180 individual elements) arranged in a column which scan the infrared scene with the aid of an oscillating mirror 13 and which convert the infrared signals of this scene into electrical signals. An amplifier chain comprising 180 preamplifiers 14 and 180 booster amplifiers 15 controls a luminescent diode array (LED) 16 (likewise comprising 180 elements) with the visible light being deflected onto the rearward side of the oscillating mirror 13. In this way, with the aid of imaging optics 10, a visible image is generated on the detector array of a CCD-camera 17 which is in-phase with the scanning operation.

The imaging optics of the thermal image apparatus sketched in FIG. 4 is not individually identified. The CCD-camera 17 transforms the visible image into a series video signal corresponding to the CCIR-television standard. The video signal is visible for the user via a monitor 18. The contrast and brightness adjustment takes place by means of amplification changes and offset shifts in the booster amplifiers 15. The control for contrast and brightness takes place starting with the TV-video signal of the CCD-camera 17 via the evaluation window 6 for the actual-value processing 19 for input to the booster amplifier 15. The TV signals are converted into DC-voltage signals in the actual-value processing 19. The switch 20 is closed only in the area of the evaluation window 6. The shift of the evaluation window 6 in the directions 11 takes place via the array evaluation circuit 21. The form of the evaluation window (shown as an isosceles triangle in the illustrated embodiment) is stored in non-volatile memory components (for example, EPROM) which are not shown in FIG. 4.

The horizontal synchronous pulses 23 generated by the CCD-camera (marking each television line start) and the vertical synchronous pulses 24 (marking the start of each television image) are used to synchronize the readout of the evaluation window 6 from the memory components with the television image 1. The shift of the evaluation window 6 is obtained after the readout from the memory components with the aid of the window displacement signal which is generated in the array evaluation circuit 21. The array evaluation circuit 21 measures the IR-array signals from the evaluation points (7a, 7b to 9a, 9b and 7a', 7b' to 9a', 9b') continuously with the IR-array signals being defined for the evaluation and coming from the amplifiers 14. However, only the amplitude values at the evaluation dots are evaluated for the generation 26 of the shift signal for the evaluation window 26. For the horizontal position of the evaluation dots, the position of the oscillating mirror 13, which is obtained from the oscillating mirror drive 25, is used as a basis.

It is understood that the foregoing description is that of the preferred embodiments of the invention and that various changes and modifications may be made thereto without departing from the spirit and scope of the invention as defined in the appended claims.

What is claimed is:

1. A control system for the automatic contrast and brightness control for thermal image apparatus of an FLIR-system integrated into an aircraft and including a TV-monitor on which an FLIR-image having an evaluation window is formed, the control system comprising:
   circuit means for fixing the shape of said evaluation window;
   actual-value forming means for forming the actual values for contrast and brightness; and, displacing circuit means for displacing said window in dependence upon the content of said FLIR-image as defined by said actual values.

2. The control system of claim 1, said thermal image including an earth scene having a lower edge and defining a horizon line; and, said circuit means being adapted to cause said evaluation window to have the form of an isosceles triangle which is disposed in said FLIR-image so as to cause the base of the triangle to be somewhat above the lower image edge of the earth scene and so as to extend over the entire width of said lower image edge and so that the apex of said triangle is somewhat below the horizon line of said scene.

* * * * *